United States Patent
Jacoby et al.

(10) Patent No.: US 11,607,655 B2
(45) Date of Patent: Mar. 21, 2023

(54) SLIDE GATE ASSEMBLY AND MIXER INCLUDING A SLIDE GATE ASSEMBLY

(71) Applicant: ILLINOIS TOOL WORKS INC., Glenview, IL (US)

(72) Inventors: Randy L. Jacoby, Sidney, OH (US); Jason D. Switzer, Sidney, OH (US); Joel L. Everhart, Tipp City, OH (US); John A. Cremeens, Troy, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 177 days.

(21) Appl. No.: 16/879,253

(22) Filed: May 20, 2020

(65) Prior Publication Data

US 2021/0362107 A1    Nov. 25, 2021

(51) Int. Cl.
| | | |
|---|---|---|
| *B22C 5/00* | (2006.01) | |
| *B01F 35/71* | (2022.01) | |
| *A21C 1/06* | (2006.01) | |
| *A21C 1/14* | (2006.01) | |
| *B01F 29/60* | (2022.01) | |
| *B01F 29/00* | (2022.01) | |
| *B01F 101/08* | (2022.01) | |

(52) U.S. Cl.
CPC .......... *B01F 35/71805* (2022.01); *A21C 1/06* (2013.01); *A21C 1/149* (2013.01); *A21C 1/1485* (2013.01); *B01F 29/401* (2022.01); *B01F 29/60* (2022.01); *B01F 29/4031* (2022.01); *B01F 2101/08* (2022.01)

(58) Field of Classification Search
CPC ............ B01F 35/71805; B01F 2101/08; B01F 29/401; B01F 29/4031; B01F 29/60; A21C 1/1485; A21C 1/06; A21C 1/149
See application file for complete search history.

(56) References Cited

U.S. PATENT DOCUMENTS

| | | | | |
|---|---|---|---|---|
| 4,528,913 A | * | 7/1985 | Randolph | ................ B61D 7/20 105/282.2 |
| 8,079,749 B2 | | 12/2011 | Kitta | |
| 2005/0082356 A1 | | 4/2005 | Shadrach | |
| 2005/0226976 A1 | | 10/2005 | Chung | |
| 2006/0255305 A1 | * | 11/2006 | Comstock | ............. F16K 27/044 251/328 |

(Continued)

OTHER PUBLICATIONS

Shaffer; Removable Flour Gate informational sheet; shaffermixers. com; Jul. 2019; one page.

*Primary Examiner* — Anshu Bhatia
*Assistant Examiner* — Gregory Y Huan
(74) *Attorney, Agent, or Firm* — Thompson Hine LLP

(57) ABSTRACT

A slide gate assembly includes a mounting plate with a through opening and an upper surface, and a top plate with a through opening and lower surface, wherein the through opening of the top plate aligns with the through opening of the mounting plate. A slide plate is mounted between the lower surface of the top plate and the upper surface of the mounting plate, wherein the slide plate is slidable between a closed position and an open position, wherein, in the closed position the slide plate blocks material passage from the opening of the top plate to the opening of the bottom plate, wherein, in the open position, the slide plate permits material passage from the opening of the top plate to the opening of the bottom plate.

19 Claims, 13 Drawing Sheets

(56) References Cited

U.S. PATENT DOCUMENTS

| | | |
|---|---|---|
| 2007/0063079 A1 | 3/2007 | Ford |
| 2008/0268119 A1 | 10/2008 | Chung |
| 2009/0260954 A1 | 10/2009 | Patterson |
| 2012/0067927 A1* | 3/2012 | Raz .................... B65D 90/587 |
| | | 222/561 |
| 2012/0234248 A1 | 9/2012 | Lytle |
| 2014/0326086 A1* | 11/2014 | Wadeson ............. B01F 35/892 |
| | | 73/865.6 |
| 2019/0359359 A1 | 11/2019 | Scalerandi |

* cited by examiner

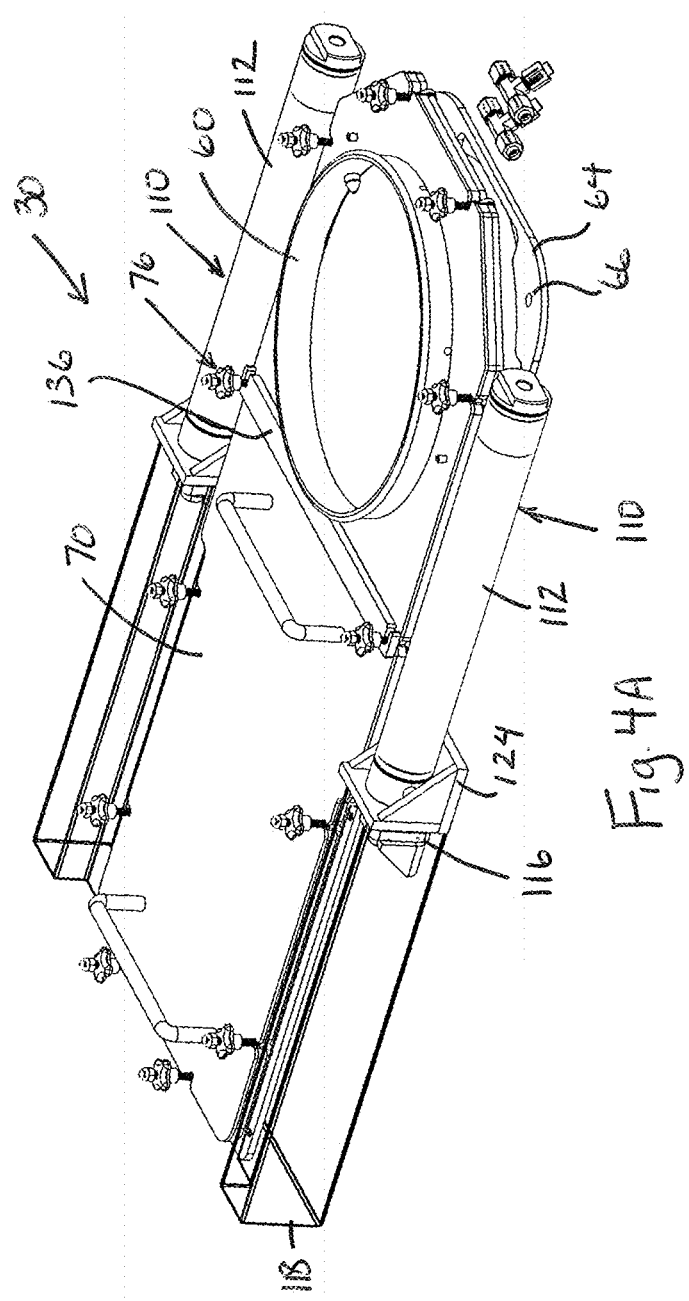

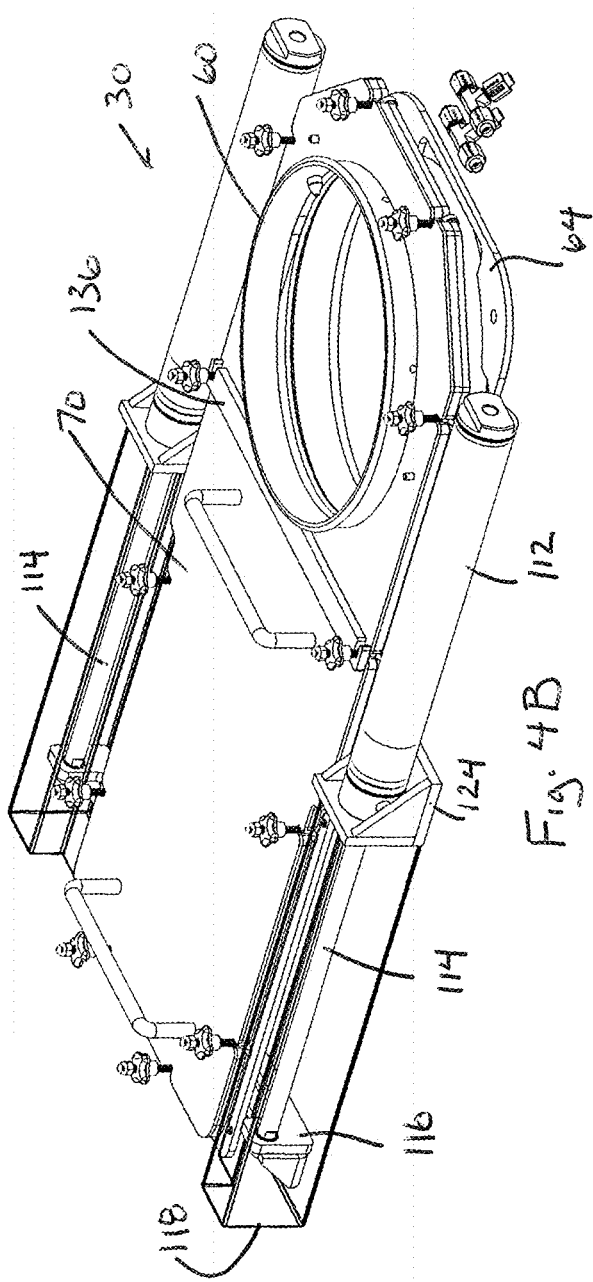

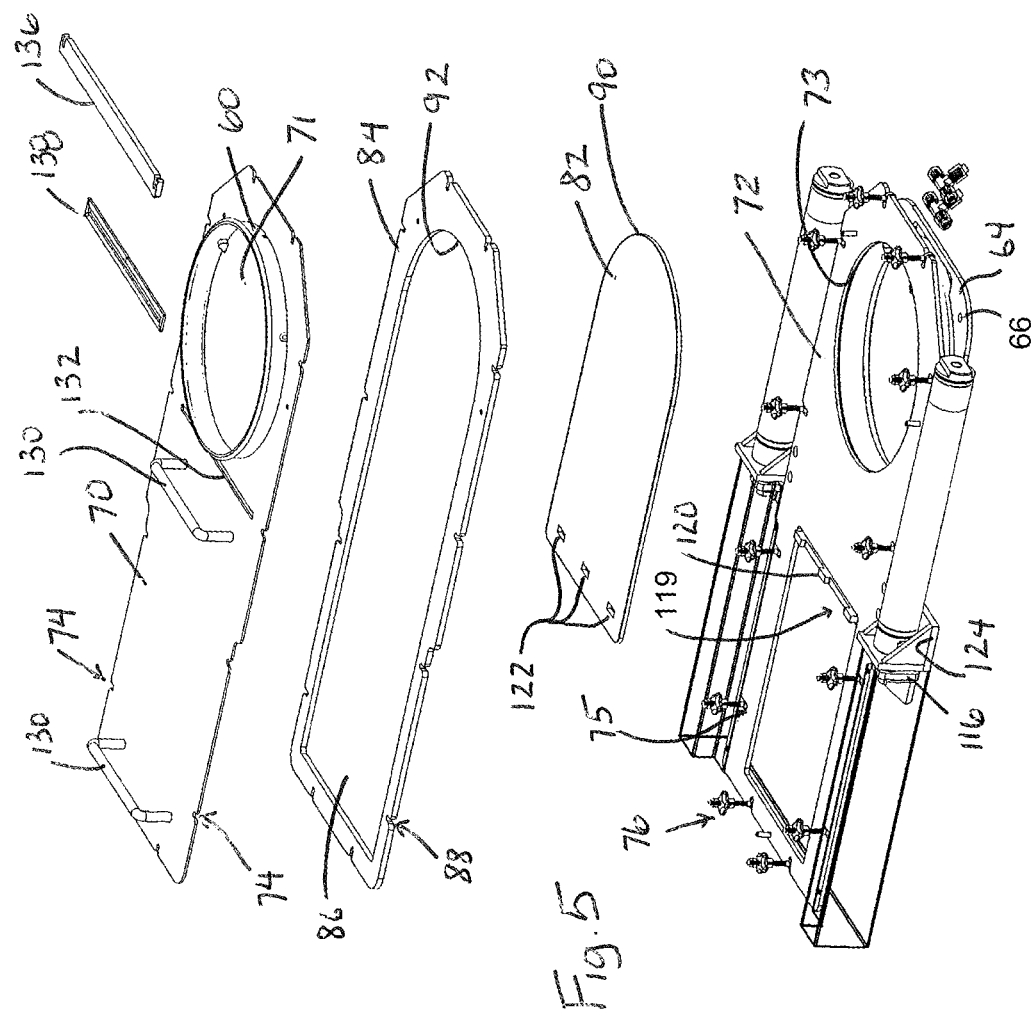

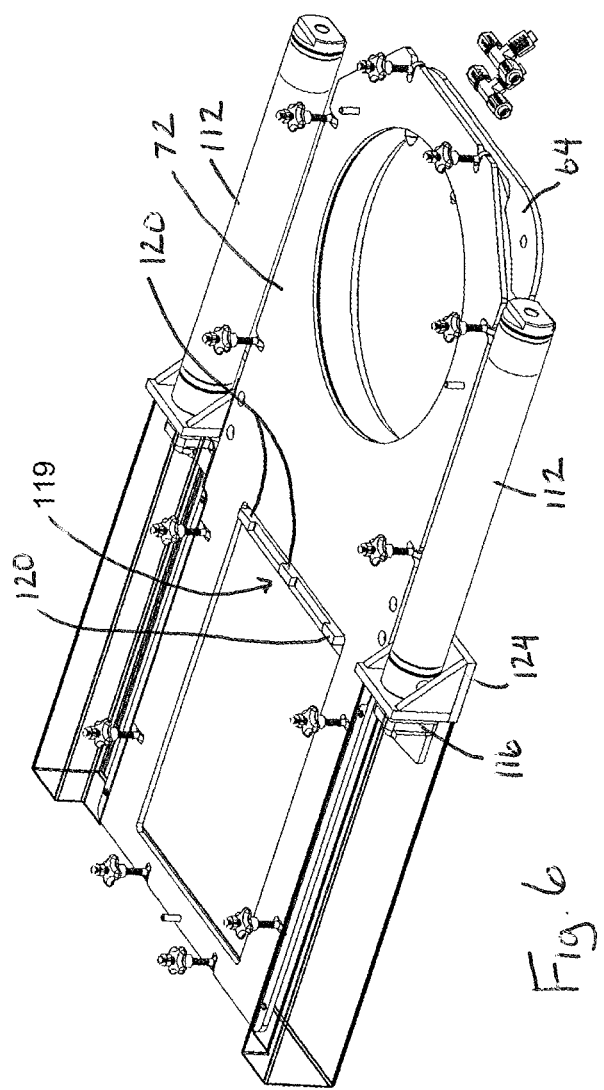

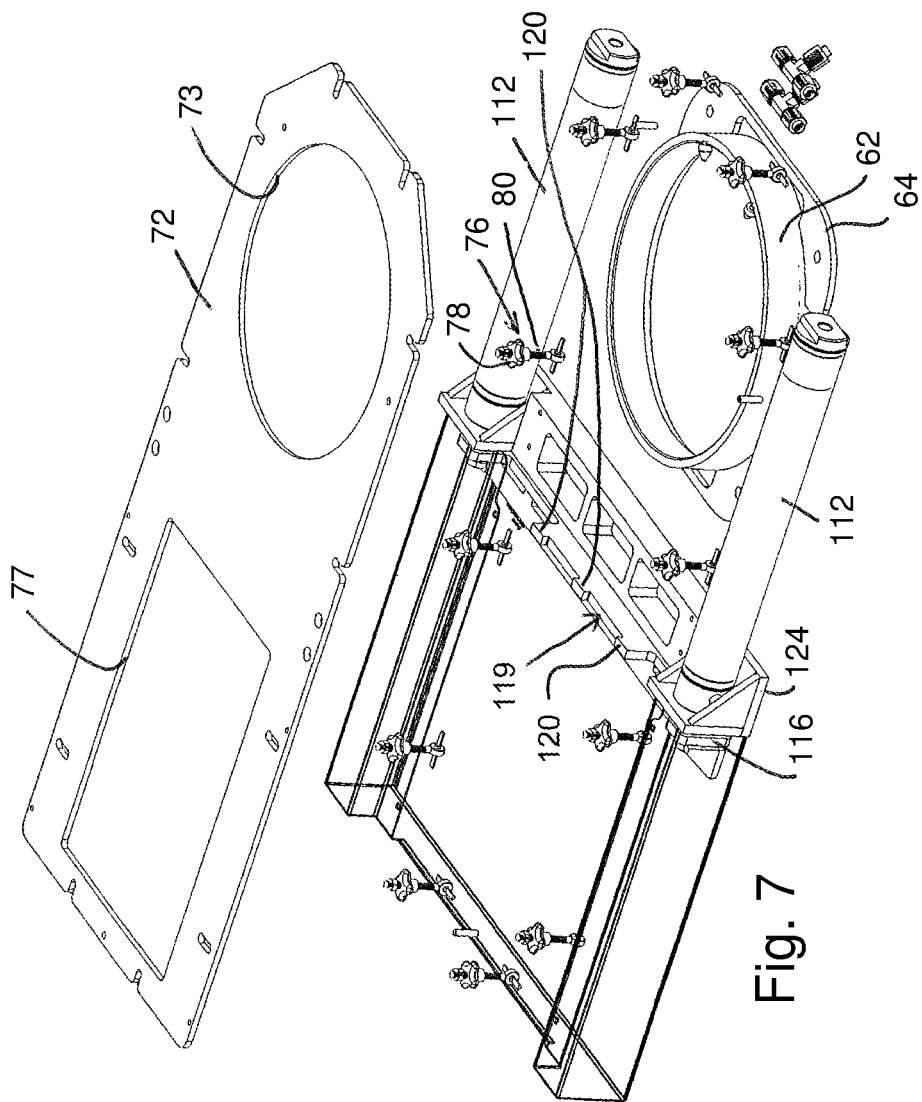

SLIDE GATE ASSEMBLY AND MIXER INCLUDING A SLIDE GATE ASSEMBLY

TECHNICAL FIELD

This application relates generally to gates for opening and closing access to food equipment, such as horizontal dough mixers, for the ingress of ingredients and, more specifically, to a slide gate assembly useful for such purpose.

BACKGROUND

Horizontal mixers commonly have an overhead canopy that covers the open top of the bowl during mixing. The canopy includes one or more openings through which mix ingredients, such as flour, can be input to the mixer bowl. It is known to use slide gates at such openings. However, removability and cleanability of such slide gates is typically time-consuming and overly complex.

It would be desirable to provide an improved slide gate assembly for horizontal mixers.

SUMMARY

In one aspect, a slide gate assembly includes a mounting plate with a through opening and an upper surface, and a top plate with a through opening and lower surface, wherein the through opening of the top plate aligns with the through opening of the mounting plate. A slide plate is mounted between the lower surface of the top plate and the upper surface of the mounting plate, wherein the slide plate is slidable between a closed position and an open position, wherein, in the closed position the slide plate blocks material passage from the opening of the top plate to the opening of the bottom plate, wherein, in the open position, the slide plate permits material passage from the opening of the top plate to the opening of the bottom plate.

In another aspect, a slide gate assembly includes a mounting plate with a through opening and an upper surface. A slide plate is positioned on the upper surface of the mounting plate and movable between a closed position that blocks material passage to the through opening and an open position that permits material passage to the through opening. A stationary framing seal mounted at the upper surface of the mounting plate, wherein the framing seal defines a slide window, and the slide plate is mounted within the slide window for movement along the slide window.

In a further aspect, a slide gate assembly includes a mounting plate with a through opening and an upper surface. A slide plate is positioned on the upper surface of the mounting plate and movable between a closed position that blocks material passage to the through opening and an open position that permits material passage to the through opening. A scraper bar having a lower surface in contact with an upper surface of the slide plate, wherein the scraper is positioned alongside the opening of the top plate such that, as the slide plate moves from the open position to the closed position, residual material on the upper surface of the slide plate is scraped off of the upper surface of the slide plate and onto the upper surface of the mounting plate.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4A shows a perspective view a slide gate assembly with slide plate in closed position;

FIG. 4B shows a perspective view of the slide gate assembly with slide plate in open position;

FIG. 5 shows a partially exploded view of the slide gate assembly;

FIG. 6 is a perspective view of portions of the slide gate assembly;

FIG. 7 is partially exploded view of FIG. 6;

DETAILED DESCRIPTION

Figure 1:
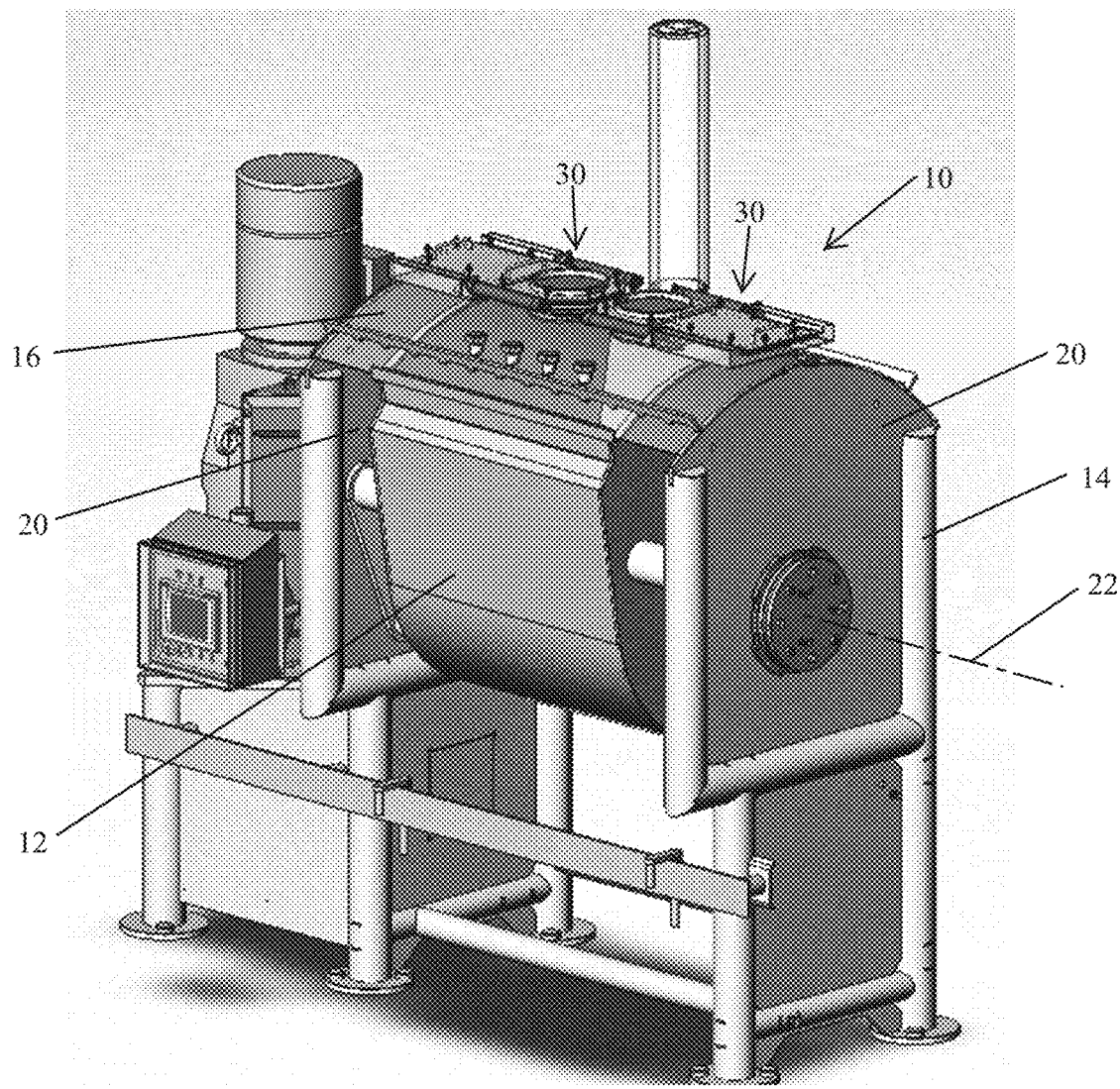
FIG. 1 shows a perspective view of a horizontal mixer with two top-mounted slide gate assemblies.
Figure 2:
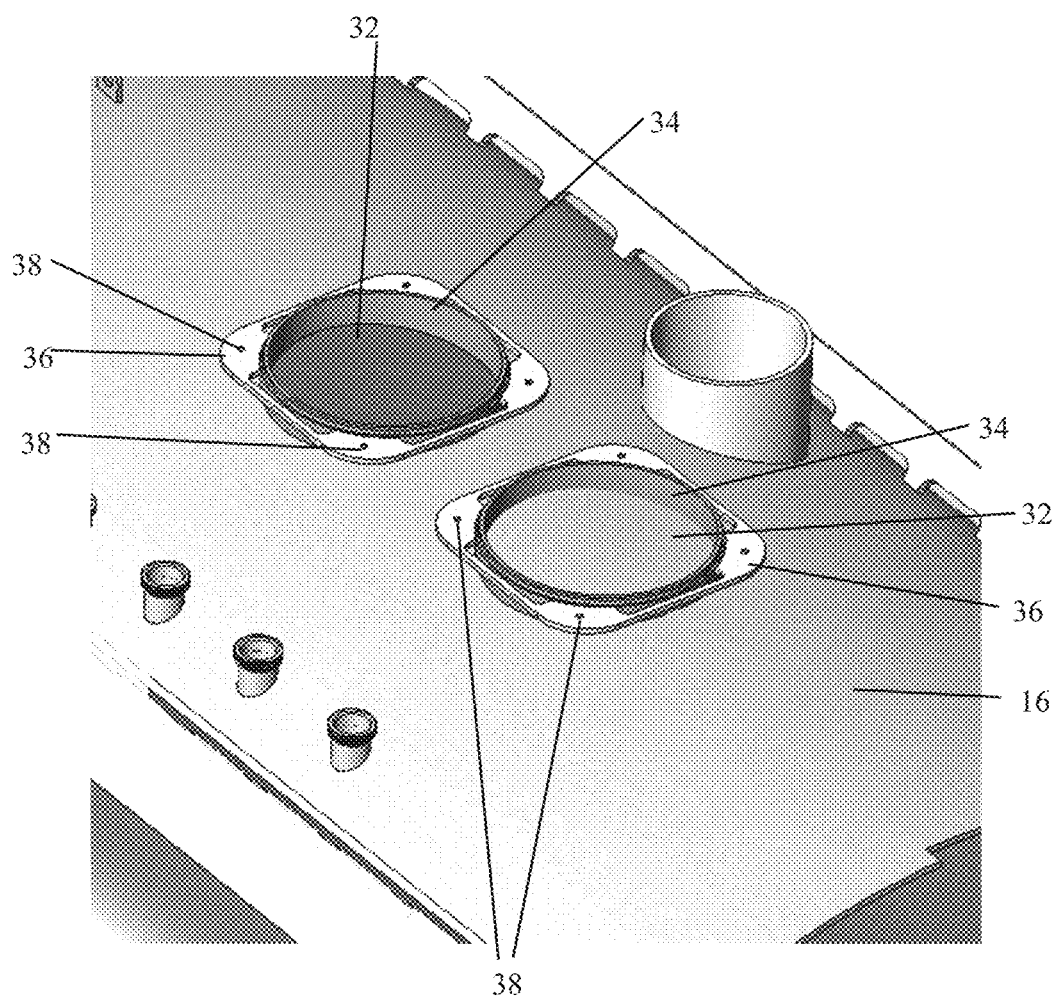
FIG. 2 shows a perspective view of the top canopy of the horizontal mixer with mounts for receiving the slide gate assemblies.

Referring to FIG. 1, a horizontal mixer 10 includes a mixing bowl 12 supported on a frame 14 and mounted for relative rotation on the frame 14. The mixing bowl 12 is an open top arrangement. A canopy 16 is located to cover the open top of the bowl when the bowl is in an upright position used for mixing. The mixing bowl 12 is supported at each end by support members that are mounted to respective support plates 20. An agitator (not shown here, but show in U.S. Pat. No. 8,079,749, which is incorporated herein by reference) is rotatably mounted within the mixing bowl 12. The mixing bowl 12 can be tilted about a horizontal axis 22 for movement between an upright mix position and a turned load/unload position (e.g., per FIG. 2 of U.S. Pat. No. 8,079,729) for loading and unloading of material.

The illustrated mixer 10 includes two slide gate assemblies 30 mounted to the top of the canopy 16 to permit controlled opening and closing of access openings 32 (FIG. 2) in the canopy. Each access opening 32 is bounded by an upwardly extending mount ring 34 having a flange 36 secured thereto. Each flange 36 defines a plurality of mount openings 38 that can be used for mounting a slide gate assembly to the canopy 16. For example, the openings 38 may be threaded, or may include a fixed mount nut at the underside thereof, and hand rotatable bolts may be used to engage a slide gate assembly thereto. This type of manually releasable connection requires no tools and enables the slide gate assembly to readily be disassembled and/or removed from the canopy for cleaning.

Figure 3:
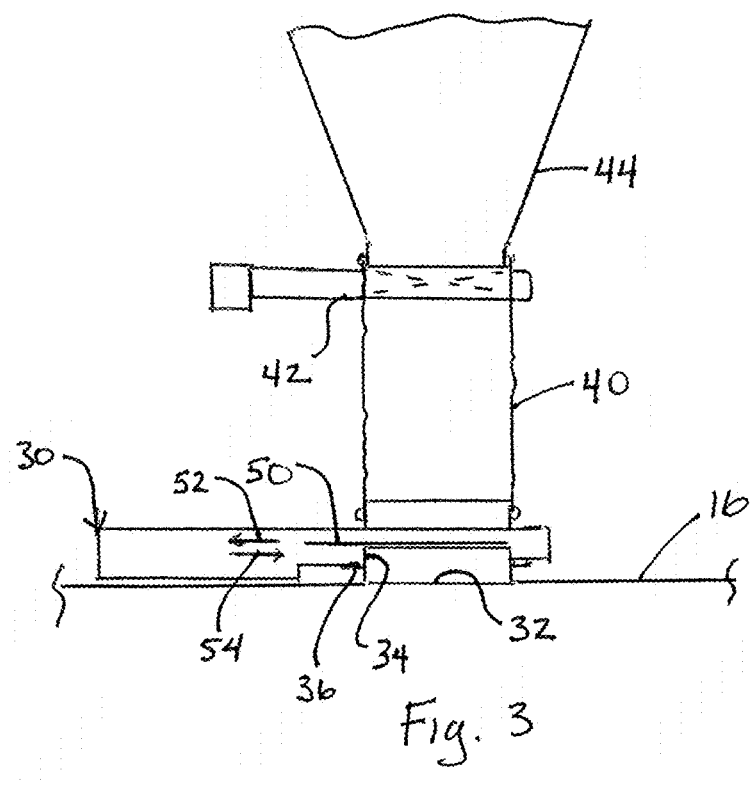
FIG. 3 shows a schematic side elevation of material feed to a slide gate assembly.
Figure 8:
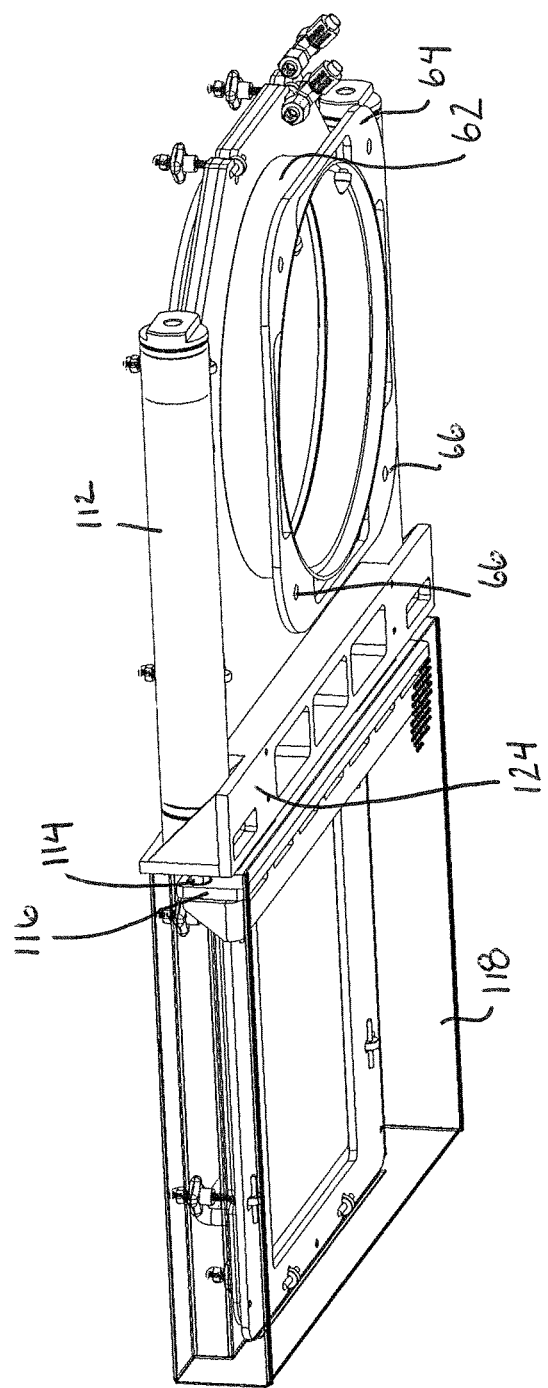
FIG. 8 is a bottom perspective of the slide gate assembly.

Referring to the schematic side elevation of FIG. 3, a slide gate assembly 30 is shown atop a canopy 16. A feed tube (e.g., flexible tube) 40 connects to the slide gate assembly and extends up to a dispensing gate 42 that in turn connected to an ingredient feed chute 44. The dispensing gate 42 may, by way of example be a weight-controlled gate that opens when a set ingredient weight to be input to the mixer bowl is achieved. The slide gate assembly 30 includes a slide plate 50 movable to open and close the access opening 32 through the canopy 16 to the mixer bowl. Here, the slide plate 50 is in the closed position. Typically, the slide plate 50 is moved, per arrow 52, to the open position, uncovering the canopy opening, before the dispensing gate 40 opens, and the slide plate 50 is moved back to the closed position, per arrow 54, covering the canopy opening, after the ingredients are dropped by the gate 40 into the mixer bowl.

After the slide plate 50 closes, it is possible that some residual ingredients in the dispensing gate 42 or the feed tube 40 could be deposited on the top of the slide plate 50. In prior slide gate systems, subsequent opening of the gate could undesirably distribute the ingredients on the top of the canopy and/or be moved to locations of the slide gate that cause difficulty in movement of the slide gate and/or jamming of the slide gate. Such prior slide gate systems also proved relatively difficult to disassemble and/or remove.

Referring to FIGS. 4A-4B and 5-8, the guide plate assembly 30, according to one embodiment, includes an upper mount ring 60 (e.g., for connection to a fed tube 40) and a lower mount ring 62 (e.g., for connection to a canopy mount ring). The lower mount ring 62 includes a mount flange 64 secured thereto with openings 66. The flange 64 and openings 66 are shaped and positioned such that the openings 66 align with the canopy flange openings.

The upper mount ring 60 is connected to and extends upwardly from an opening 71 in a top plate 70, and the lower mount ring 62 is connected to and extends downwardly from an opening 73 in a mounting plate 72. The two plates 70 and 72 include a plurality of peripheral slots 74 and 75 that are aligned and through which fastener assemblies 76 extend for holding the top plate 70 toward the mounting plate 72 when the slide plate assembly is in the assembled condition. The fastener assemblies 76 may, for example be formed by threaded rods 80 and manually graspable mount nuts 78. A slide plate 82 and slide plate peripheral framing seal 84 are positioned between the top plate 70 and mounting plate 72 in the assembled condition. The framing seal 84 defines a window 86 in which the slide plate 80 is positioned, so that the slide plate can move along the length of the window for opening and closing of the gate. The framing seal 84 also includes peripheral slots 88 that align with the slots 74 and 75 to fix the position of the framing seal relative to the two plates 70 and 72. The lateral width of the slide plate 82 closely corresponds to the lateral width of the window 86 so that the window guides the movement of the slide plate 82. The arcuate end edge 90 of the slide plate also matches the shape of the arcuate end edge 92 of the window to achieve effective gate closure, and the radius of the arcs defining the edges substantially matches the radius of the openings 71 and 73 (e.g., the arcuate end edges 90 and 82 may extend through 180 degrees to follow one half of the perimeter contour of the opening 73). The framing seal 84 and slide plate 82 are both of generally planar configuration. The framing seal 84 is slightly thicker than the slide plate 82, which facilitates relatively low friction sliding of the slide plate, because the top plate 70 does not press against the upper surface of the slide plate 82. Instead the top plate 70 and mounting plate 72 clamp against the thicker framing seal 84.

By way of example, the top plate 70 and bottom plate may be formed of 304 stainless steel and the slide plate 82 and framing seal 84 may be formed of food grade UHMW polyethylene. However, other variations are possible.

Movement of the slide plate 82 is achieved by spaced apart linear actuators 110, here in the form of pneumatic actuators with cylinders 112 and extendable/retractable drive rods 114 that connect to the ends of the same lateral u-shaped drive bar or bracket 116. The drive bar 116 and rods move within a protective u-shaped housing 118, which is illustrated as transparent in the figures for ease of understanding. The cylinders 112 include air inputs at both ends so that the rods 114 can be driven in both directions (i.e., one direction to extend from the cylinders and an opposite direction to retract into the cylinders). The drive bar 116 includes a middle segment 118 with spaced apart upwardly extending fingers 120 that engage within corresponding spaced apart openings 122 toward the rectangular end of the slide plate 82. The engagement between the fingers 120 and openings 122 causes the slide plate 82 to move with the drive bar 116. The middle segment 118 extends upward through a rectangular opening 77 in the mounting plate 72 and moves along the opening during movement of the drive bar 116. The ends of the cylinders 112 connect to a lateral bracket 124 that remains fixed during movement of the drive bar 116 and slide plate 82.

Figure 9:
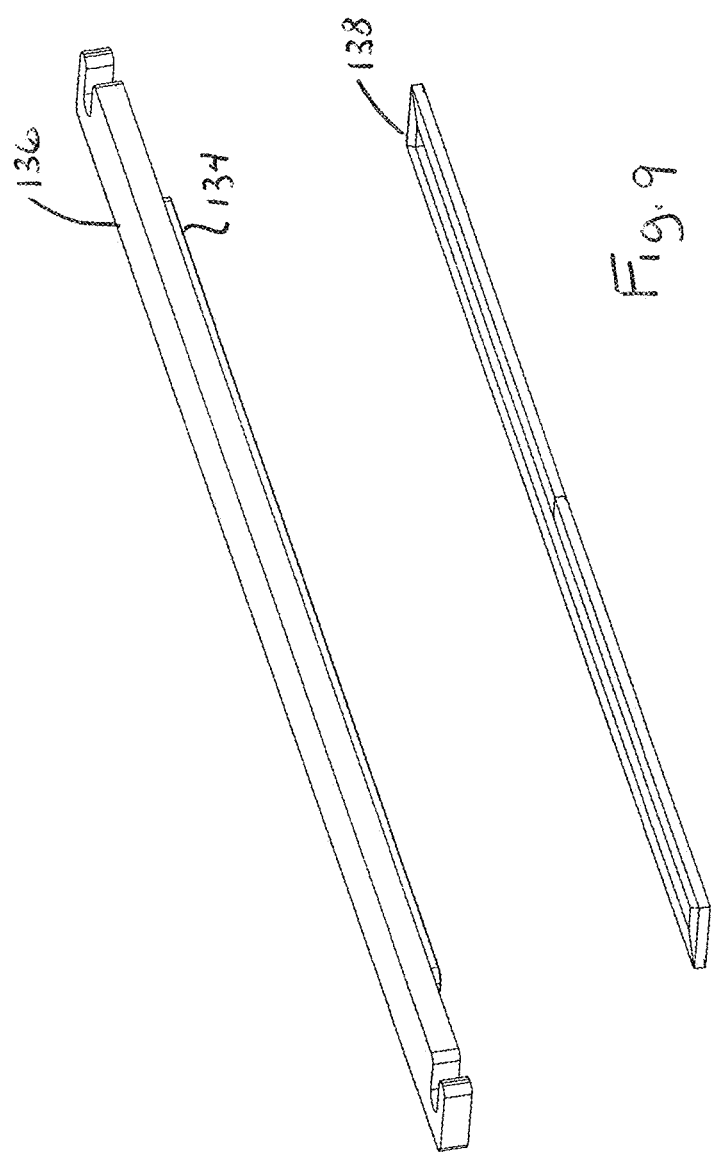
FIG. 9 is a perspective view of a seal bar and associated gasket.

The top plate 70 includes handles 130 to facilitate removal for cleaning. The top plate also includes a lateral slot opening 132 through which a lower projection 134 (FIG. 9) of a seal bar 136 extends. A gasket 138 may be positioned between the top portion of the seal bar 136 and the upper surface of the top plate for sealing, and includes a slot opening through which the projection 134 extends. However, variations without the gasket are also possible. The seal bar 136 may be removably held in place by a pair of the fastener assemblies 76. As best seen in the cross-sections of FIGS. 10 and 11, the lower projection 134 of the seal bar 136 is positioned to be in sliding contact with the top surface of the slide plate 82 when the slide plate moves, and preferably along the entire width of the slide plate top surface. By way of example, the seal bar 136 may be formed of 304 stainless steel and the gasket 138, if used, may be formed of closed cell silicone. However, other variations are possible.

Figure 10:
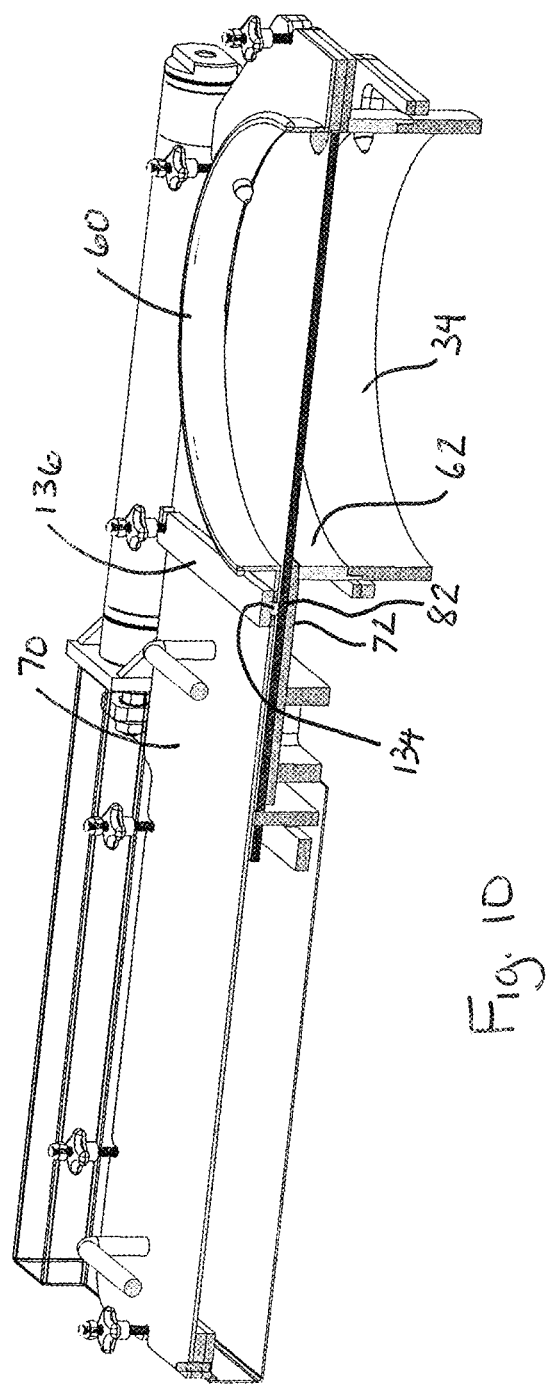
FIG. 10 is perspective cross-section of the slide gate assembly with slide gate in closed position.
Figure 11:
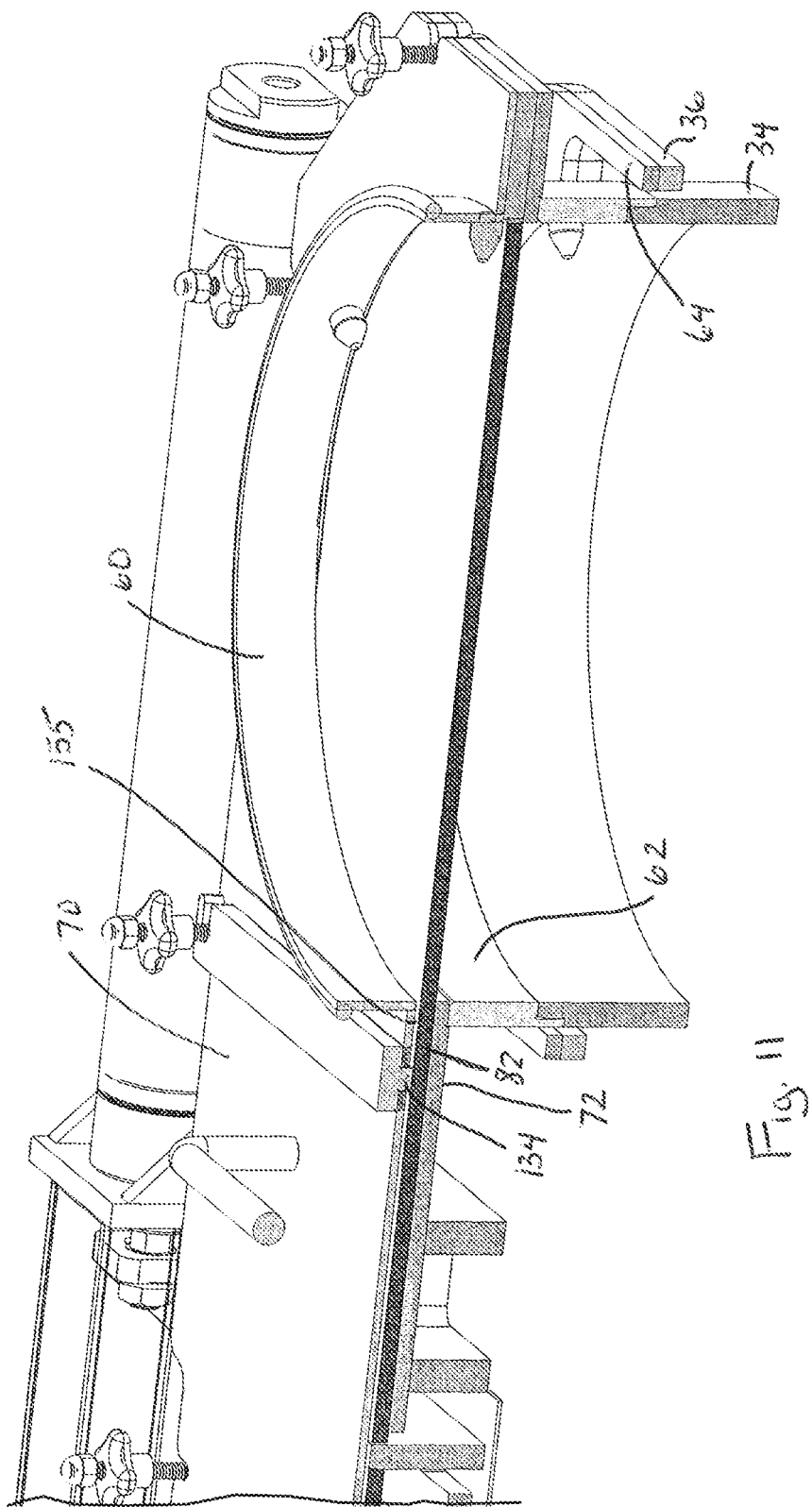
FIG. 11 is an enlarged view of part of FIG. 10.

FIGS. 10 and 11 also shows the engagement of the slide gate assembly mount ring 62 with the canopy mount ring 34 via joining of the respective mount flanges 64 and 36 (e.g., using fasteners through the aligned openings of the flanges).

Figure 12:
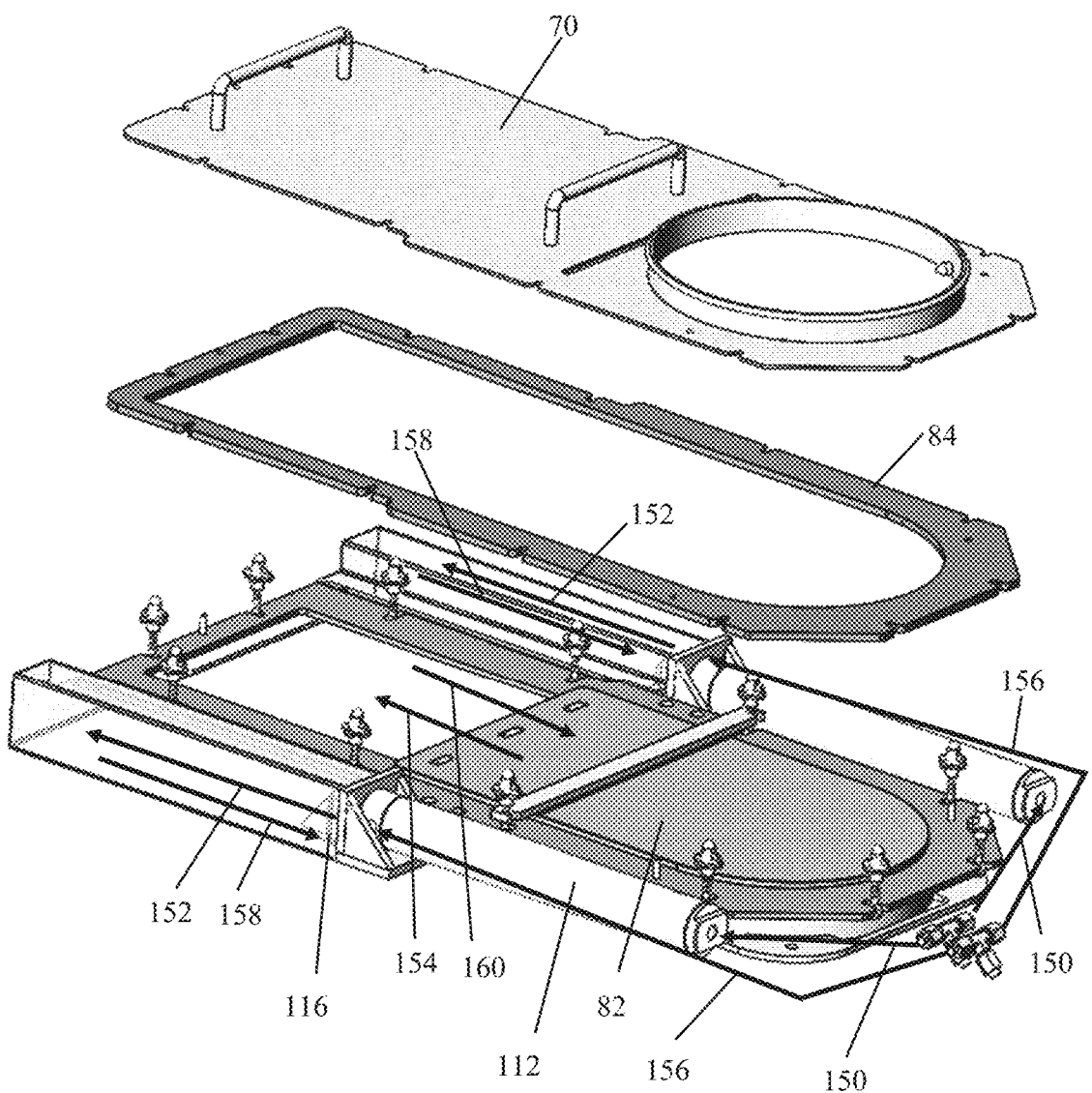
FIG. 12 is another partially exploded view of the slide gate assembly.

Operation of the slide gate assembly is described below with reference to FIGS. 11 and 12. Air is delivered by via airlines (arrows 150) to one end of the cylinders 112 to extend both cylinder rods, thus driving the drive bar 116 away from the cylinders per arrows 152. The drive bar 116 pulls along the slide gate 82, per arrow 154, to move the slide gate to the open position (not shown). Magnetic read switches (not shown) attached to both ends of each cylinder 112 signal (e.g., to a controller) when the slide plate 82 is fully open or fully closed by sensing the head of the pistons inside the cylinders 112. As the slide plate 82 moves from its closed position to its open position, some of the ingredients atop the slide plate 82 will be scraped off of the top of the slide plate 82 and into the bowl by interaction with the mount ring 60. Any residual ingredients that pass below the bottom edge of the mount ring 60 will be scraped off the top surface of the mount plate by the projection 134 of the seal bar 136, causing the ingredients to drop into the bowl below the slide gate assembly or to drop onto the top surface of the mounting plate 72 (e.g., in gap 155). The slide plate 82 is moved back to the closed position by delivering air via airlines (arrows 156) to the far ends of the cylinders 112, retracting the rods into the cylinders, per arrows 158) and moving the drive bar 116 and slide plate 82 back, per arrow 160) to close off the bottom of the mount ring 62. The magnetic switches relay to the machine controller that the gate is closed. As the slide plate 82 moves back, the leading arcuate edge of the slide plate pushes and ingredients in the gap 155 back into the opening to drop into the bowl below the slide plate assembly. Thus, the slide plate assembly provides an arrangement that is very effective at reducing any build-up of ingredients along the path of the slide plate, improving performance of the gate assembly.

In addition, cleaning of the slide gate assembly 30 is facilitated. In particular, the fastener assemblies 76 can be released in order to enable the seal bar 136 and top plate 70 to be removed, exposing the slide plate 82 for straightforward wipe down cleaning. In addition, the slide plate 82 is no longer captured, and can then be pulled upward away from the mounting plate 72, as can the framing seal 84, enabling cleaning of upper and lower surfaces of both, as well as the top surface of the mounting plate 72.

It is to be clearly understood that the above description is intended by way of illustration and example only, is not intended to be taken by way of limitation, and that other changes and modifications are possible.

What is claimed is:

1. A slide gate assembly, comprising: a mounting plate with a through opening and an upper surface; a top plate with a through opening and lower surface, wherein the through opening of the top plate aligns with the through opening of the mounting plate; and a slide plate mounted between the lower surface of the top plate and the upper surface of the mounting plate, wherein the slide plate is slidable between a closed position and an open position, wherein, in the closed position the slide plate blocks material passage from the opening of the top plate to the opening of the mounting plate, wherein, in the open position, the slide plate permits material passage from the opening of the top plate to the opening of the mounting plate; and a drive arrangement for the slide plate is formed by a pair of spaced apart linear actuators that are connected to ends of a drive bar, wherein the drive bar is located below the mounting plate and multiple fingers extend upward from the drive bar, through the mounting plate and into engagement with corresponding openings of the slide plate.

2. The slide gate assembly of claim 1, wherein the top plate is secured to the mounting plate by a plurality of manually releasable fastener assemblies that can be released without use of tools.

3. The slide gate assembly of claim 2, wherein the top plate includes a plurality of peripheral first slots, the mounting plate includes a plurality of peripheral second slots aligned with the plurality of peripheral first slots, and each fastener assembly is engaged through a respective slot pair defined by one of the peripheral first slots and one of the peripheral second slots.

4. The slide gate assembly of claim 1, wherein a framing seal is mounted between the lower surface of the top plate and the upper surface of the mounting plate, wherein the framing seal defines a slide window, and the slide plate is mounted within the slide window for movement along the slide window.

5. The slide gate assembly of claim 4, wherein a thickness of the framing seal is greater than a thickness of the slide plate.

6. The slide gate assembly of claim 4, wherein a first end of the slide plate is arcuate in shape and a first end of the slide window has a corresponding mating arcuate shape.

7. The slide gate assembly of claim 6, wherein the arcuate shape of the slide window follows an arcuate curvature of a portion of the opening of the mounting plate.

8. The slide gate assembly of claim 1, further comprising:
a scraper extending down from the top plate and into contact with an upper surface of the slide plate, wherein the scraper is positioned alongside the opening of the top plate such that, as the slide plate moves from the open position to the closed position, residual material on the upper surface of the slide plate that enters a gap between the top plate and the mounting plate is scraped off of the upper surface of the slide plate and onto the upper surface of the mounting plate.

9. The slide gate assembly of claim 8, wherein, upon movement of the slide plate from the open position to the closed position, material on the upper surface of the mounting plate is pushed by an edge of the slide plate back toward the opening in the mounting plate.

10. The slide gate assembly of claim 8, wherein the scraper is formed by a lower projection of a seal bar that is connected to the top of the top plate, and the top plate includes a slot opening through which the projection extends.

11. A horizontal mixer including the slide gate assembly of claim 1, and comprising:
a mixer bowl mounted for rotation about a horizontal axis between an upright mix position and a turned load/unload position;
a canopy located to cover an open top of the bowl when the bowl is in the upright mix position;
wherein the slide gate assembly is mounted atop the canopy at a material inlet opening of the canopy.

12. A slide gate assembly, comprising: a mounting plate with a through opening and an upper surface; a top plate with a through opening and a lower surface, wherein the through opening of the top plate aligns with the through opening of the mounting plate; a slide plate positioned between the upper surface of the mounting plate and the lower surface of the top plate, the slide plate movable between a closed position that blocks material passage to the through opening of the mounting plate and an open position that permits material passage to the through opening of the mounting plate; a stationary framing seal mounted at the upper surface of the mounting plate, wherein the framing seal defines a slide window, and the slide plate is mounted within the slide window for movement along the slide window; wherein the stationary framing seal surrounds a forward edge, a rear edge, and side edge portions of the slide plate.

13. The slide gate assembly of claim 12, wherein the forward edge portion of the slide plate is arcuate in shape and a forward end of the slide window has a corresponding mating arcuate shape.

14. The slide gate assembly of claim 13, wherein the arcuate shape of the slide window follows an arcuate curvature of a portion of the through opening.

15. The slide gate assembly of claim 12, wherein a thickness of the framing seal is greater than a thickness of the slide plate.

16. The slide gate assembly of claim 12, wherein a drive arrangement for the slide plate is formed by a pair of spaced apart linear actuators that are connected to ends of a drive bar, and the drive bar is connected to the slide plate.

17. The slide gate assembly of claim 16, wherein the drive bar includes a main portion that runs below the stationary framing seal, and another portion that extends up into the slide window and engages the slide plate.

18. A horizontal mixer including the slide gate assembly of claim 12, and comprising:
a mixer bowl mounted for rotation about a horizontal axis between an upright mix position and a turned load/unload position;
a canopy located to cover an open top of the bowl when the bowl is in the upright mix position;
wherein the slide gate assembly is mounted atop the canopy at a material inlet opening of the canopy.

19. A slide gate assembly, comprising: a mounting plate with a through opening and an upper surface; a top plate with a through opening and a lower surface, wherein the through opening of the top plate aligns with the through opening of the mounting plate; a slide plate positioned between the upper surface of the mounting plate and the lower surface of the top plate, the slide plate movable between a closed position that blocks material passage to the through opening of the mounting plate and an open position that permits material passage to the through opening of the mounting plate; a scraper bar having a lower surface in contact with an upper surface of the slide plate, wherein the scraper bar is positioned alongside the opening of the top plate such that, as the slide plate moves from the open position to the closed position, residual material on the upper surface of the slide plate is scraped off of the upper surface of the slide plate and onto the upper surface of the mounting plate, wherein the top plate includes a through slot opening from an upper surface of the top plate to the lower surface of the top plate, wherein the scraper bar is formed by a lower projection of a seal bar, wherein the seal bar is connected to the upper surface of the top plate and the lower projection extends downward from the seal bar and through the through slot opening.

\* \* \* \* \*